United States Patent
Adachi et al.

(10) Patent No.: US 7,090,877 B2
(45) Date of Patent: Aug. 15, 2006

(54) COTTONY BEAN CURDS AND METHOD OF MANUFACTURING THE COTTONY BEAN CURD

(75) Inventors: Tomohiko Adachi, Kobe (JP); Shin Nakatani, Kobe (JP)

(73) Assignee: Fuji Oil Company, Limited, Osaka (JP)

( * ) Notice: Subject to any disclaimer, the term of this patent is extended or adjusted under 35 U.S.C. 154(b) by 283 days.

(21) Appl. No.: 10/481,453

(22) PCT Filed: Jun. 10, 2002

(86) PCT No.: PCT/JP02/05757

§ 371 (c)(1),
(2), (4) Date: Dec. 19, 2003

(87) PCT Pub. No.: WO03/000072

PCT Pub. Date: Jan. 3, 2003

(65) Prior Publication Data

US 2004/0156976 A1    Aug. 12, 2004

(30) Foreign Application Priority Data

Jun. 21, 2001    (JP) ............................ 2001-188546

(51) Int. Cl.
*A23L 1/20*    (2006.01)
(52) U.S. Cl. ........................ 426/46; 426/634; 426/578
(58) Field of Classification Search .................. 426/46, 426/634, 655, 578, 465
See application file for complete search history.

(56) References Cited

FOREIGN PATENT DOCUMENTS

| EP | 334461 | 9/1989 |
|---|---|---|
| JP | 61-139356 | 6/1986 |
| JP | 2-49557 | 2/1990 |
| JP | 10-75732 | 3/1998 |
| JP | 11-169128 | 6/1999 |

*Primary Examiner*—Keith Hendricks
(74) *Attorney, Agent, or Firm*—Wenderoth, Lind & Ponack, L.L.P.

(57) ABSTRACT

A method of manufacturing cottony bean curd having freezing-durability, comprising the steps of acting a coagulant on soymilk, in which ungelatinized starch has been formulated, at a temperature lower than the gelatinization starting temperature of the starch and heating the resultant mixture during or after press-forming.

9 Claims, No Drawings

COTTONY BEAN CURDS AND METHOD OF MANUFACTURING THE COTTONY BEAN CURD

FIELD OF THE INVENTION

The present invention relates to freezing-durable cottony bean curd (tofu) and a method of manufacturing the same.

BACKGROUND OF THE INVENTION

Various methods of manufacturing freezing-durable bean curd have been proposed. Most of them are those of manufacturing so-called silken bean curd (kinu tofu) in which whey is not removed from curds. Among them, JP 11-169128 A discloses freezing-durable bean curd containing starch, and that soft bean curd can be produced by coagulating soybean milk and then draining the resultant curds. However, when the temperature of soybean milk at the time of addition of starch is higher than the gelatinization starting temperature, curds are hardly bound to one another due to an insufficient drain, and the desired bean curd therefore cannot be obtained.

As used herein, the cottony bean curd includes cottony bean curd produced by adding a coagulant to soybean milk to obtain solidified curds and then breaking the solidified curds, followed by press-forming; soft bean curd produced similarly except for breaking solidified curds; and processed foods made therefrom. Regular cottony bean curd is produced by breaking curds once solidified, then draining broken curds and binding the broken curds again to one another, and an important aspect of the quality of cottony bean curd is to break solidified curds and to bind the broken curds again to one another with pressing, otherwise bean curd of good quality cannot be obtained.

Generally, in freezing-durable bean curd such as silken bean curd, water present in the texture thereof is retained by a water retention agent such as starch, other proteins, gums, etc. Since it is very difficult to drain such a material in which the texture has been formed in a draining step, followed by binding the drained materials to one another. Therefore, freezing-durable cottony bean curd is scarcely found in the art.

Accordingly, an objective of the present invention is to provide freezing-durable cottony bean curd.

DISCLOSURE OF THE INVENTION

The present invention is a method of manufacturing cottony bean curd comprising steps of acting a coagulant on soybean milk, in which ungelatinized starch has been formulated, at a temperature lower than the gelatinization starting temperature of the starch, and heating the resultant mixture during or after press-forming. Preferably, the starch is added in an amount of 0.3% by weight to 3% by weight based on the soybean milk. Further, preferably, the heating temperature is 80° C. or higher. By means of these methods, cottony bean curd having excellent mouthfeel and flavor can be obtained.

The present invention a method of manufacturing cottony bean curd comprising steps of acting a coagulant on soybean milk, in which ungelatinized starch has been formulated, at a temperature lower than the gelatinization starting temperature of the starch, and heating the resultant mixture during or after press-forming.

The method of manufacturing freezing-durable cottony bean curd employed in the present invention can utilize conventional procedures except for those described hereinafter.

First, the terms in the present invention are explained.

The gelatinization starting temperature means a temperature at which the gelatinization of starch is initiated. The gelatinization temperature is a temperature at which starch is gelatinized and maximum viscosity is observed. The starch is preferably modified starch, more preferably ether-crosslinked starch. Its amount to be added is preferably 0.3% by weight to 3% by weight based on the soybean milk. When the amount is less than 0.3% by weight, freezing-durability effect is decreased. When the amount exceeds 3% by weight, sticky mouthfeel of starch is caused.

The temperature at which a coagulant is added to soybean milk is a temperature lower than the gelatinization starting temperature of starch, preferably, at least 5° C. lower than the gelatinization starting temperature.

Accordingly, a coagulant mentioned herein is preferably a coagulant which is reactive even at a temperature lower than the gelatinization starting temperature of starch, especially a chloride is preferred. Preferred examples thereof include a bittern (magnesium chloride) which is reactive even at such a temperature range, for example 40° C. to 60° C., as well as calcium sulfate, glucono delta lactone, calcium chloride, and the like.

The temperature at which the heating is performed during or after press-forming is preferably a temperature higher than the gelatinization temperature of starch, i.e., usually 80° C. or higher, which is a temperature employed in conventional steam heating. Such a temperature has three advantages, namely, (1) elevating the temperature to a level higher than the gelatinization temperature of starch whereby promoting the gelatinization, (2) sterilizing bean curd, and (3) promoting the reaction of the coagulant. When the temperature is lower than 80° C., insufficient gelatinization of starch is caused, and the gel quality tends to be deteriorated.

Further, as the method for heating, frying treatment can be performed to produce frozen fried cottony bean curd (fried tofu cutlet, atsuage).

The concept of the method of the present invention is based on the procedures in which soybean milk containing a material having water retention ability is solidified using a coagulant, and the resultant curds are broken, and the broken curds are bound to each other with draining before gelatinization of starch. Once the starch was gelatinized completely, the curds can no longer be drained and cannot be bound to one another again.

BEST MODE FOR CARRYING OUT THE INVENTION

The present invention is further illustrated by the following Examples, but they are not to be construed to limit the scope of the present invention.

EXAMPLE 1

To 5 kg of whole soybeans was added 15 kg of water at 10° C., and the soybeans were soaked therein for 14 hours. The mixture was separated with a 10 mesh sieve into soaked whey and soaked soybean. The soaked soybeans were ground together with 25 kg of grinding water using a grinder (manufactured by NAGASAWA KIKAI SEISAKUSHO CO., LTD.) to obtain soybean puree. The puree was separated using a separator (manufactured by K.K. TOFER) into soybean milk (solids content: 9% by weight) and soy pulp (okara). The soybean milk thus obtained is heated at 98° C. for 5 minutes using an indirect heating device (manufactured by K.K. HOSHITAKA). The resultant soybean milk was adjusted at 50° C., and its 100 parts aliquot was combined with 6 parts of water in which 0.3 parts of bittern and 2 parts of a starch DERIKA E-7 (manufactured by Nichiden Kagaku K.K., gelatinization starting temperature: 56° C., gelatinization temperature: 75° C.) had been dispersed to prepare bean curds, which were allowed to stand for 10 minutes. The curds were broken into about 10 mm-size portions using a spatula. The portions were placed in a 30 cm×30 cm box, and the thickness was adjusted to 30 mm, and the box was placed in a steaming chamber at 90° C. where it was heated for 40 minutes with draining by applying pressure of 2 kg/cm² from the top. The resultant cake was cut into 30 mm cubes, which were frozen in a freezer (manufactured by Daiwa Reiki Kogyo) (freezing temperature: −35° C.).

EXAMPLE 2

According to the same manner as that of Example 1, bean curd was produced except that the coagulation temperature was 53° C.

EXAMPLE 3

According to the same manner as that of Example 1, bean curd was produced except that the heating temperature was 70° C.

EXAMPLE 4

According to the same manner as that of Example 1, bean curd was produced except that the amount of the starch was 0.25% by weight.

EXAMPLE 5

According to the same manner as that of Example 1, bean curd was produced except that the amount of the starch was 3.5% by weight.

EXAMPLE 6

According to the same manner as that of Example 0.1, bean curd was produced except that the broken curds were drained with applying pressure of 2 kg/cm² from the top, followed by placing the curds in a steaming chamber at 90° C.

EXAMPLE 7

According to the same manner as that of Example 1, bean curd was produced except that the broken curds were drained with applying pressure of 2 kg/cm² from the top, followed by frying the curds at 165° C. for 5 minutes.

COMPARATIVE EXAMPLE 1

According to the same manner as that of Example 1, bean curd was produced except that the coagulation temperature employed here was 70° C.

TABLE 1

(Evaluation results)

| Item | Example 1 | Example 2 | Example 3 | Example 4 | Example 5 | Example 6 | Example 7 | Comparative Example 1 |
| --- | --- | --- | --- | --- | --- | --- | --- | --- |
| Binding property | 5 | 5 | 5 | 5 | 5 | 5 | 4 | 1 |
| Mouthfeel | 5 | 4 | 3.5 | 3.5 | 3.5 | 4 | 4 | — |
| Flavor | 5 | 5 | 5 | 5 | 4 | 5 | 5 | — |

In the evaluation, the score 5 was judged as good and the score 1 was judged as undesirable, and the score 3 or higher was judged to be commercially valuable. Five panelists judged the products, and the binding property was judged by evaluating the binding state of the bean curd after pressurizing and heating the broken curds. The mouthfeel and flavor were judged after thawing the bean curd at room temperature.

Example 1 had desired binding property and was excellent in mouthfeel and flavor.

Example 2 was also good.

Example 3 had slightly poor mouthfeel because the heating temperature was somewhat low.

Example 4 had slightly poor mouthfeel because the amount of starch was somewhat insufficient.

Example 5 had slightly heavier mouthfeel because the amount of the starch was somewhat too much.

Example 6 was good.

Example 7 was a preferred fried bean curd.

No binding of curds was resulted in Comparative Example 1.

INDUSTRIAL APPLICABILITY

According to the present invention, a method of manufacturing freezing-durable cottony bean curd can be provided, and a frozen cottony bean curd product having satisfactory mouthfeel and flavor can be provided.

The invention claimed is:

1. A method of manufacturing cottony bean curd comprising steps of acting a coagulant on soybean milk, in which ungelatinized starch has been formulated, at a temperature lower than the gelatinization starting temperature of the starch to obtain solidified curd, breaking the solidified curd, and heating broken curds during or after press-forming the curds.

2. The method according to claim 1, wherein the starch is added in an amount of 0.3% by weight to 3% by weight based on the soybean milk.

3. The method according to claim 1, wherein the heating temperature is 80° C. or higher.

4. The cottony bean curd product obtained by the method according to claim 1.

5. The method according to claim 2, wherein the heating temperature is 80° C. or higher.

6. The cottony bean curd product obtained by the method according to claim 2.

7. The cottony bean curd product obtained by the method according to claim 3.

8. The cottony bean curd product obtained by the method according to claim 5.

9. A method of manufacturing fried cottony bean curd comprising steps of acting a coagulant on soybean milk, in which ungelatinized starch has been formulated, at a temperature lower than the gelatinization starting temperature of the starch to obtain solidified curd, breaking the solidified curd, and frying broken curds during or after press-forming the curds.

* * * * *